(12) United States Patent
Brjazovski et al.

(10) Patent No.: US 7,716,247 B2
(45) Date of Patent: May 11, 2010

(54) MULTI-PROTOCOL ACCESS TO FILES AND DIRECTORIES

(75) Inventors: Arkadi Brjazovski, Redmond, WA (US); Rohan Kumar, Redmond, WA (US); Sameet H. Agarwal, Redmond, WA (US); Stefan R. Steiner, Sammamish, WA (US); Mahesh K. Sreenivas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 11/612,105

(22) Filed: Dec. 18, 2006

(65) Prior Publication Data

US 2008/0147665 A1 Jun. 19, 2008

(51) Int. Cl.
*G06F 7/00* (2006.01)

(52) U.S. Cl. .................. 707/792; 707/802; 707/812; 707/999.1

(58) Field of Classification Search .......... 707/1, 707/8, 10, 100, 102, 104.1, 200, 792; 717/122; 711/100
See application file for complete search history.

(56) References Cited

U.S. PATENT DOCUMENTS

| | | | | |
|---|---|---|---|---|
| 3,996,449 A * | 12/1976 | Attanasio et al. | ............ | 235/431 |
| 5,179,703 A * | 1/1993 | Evans | .......................... | 717/122 |
| 5,247,675 A * | 9/1993 | Farrell et al. | ................. | 718/103 |
| 6,340,977 B1 * | 1/2002 | Lui et al. | .................... | 715/709 |
| 6,704,803 B2 * | 3/2004 | Wilson et al. | ................ | 719/315 |
| 6,795,967 B1 * | 9/2004 | Evans et al. | .................. | 719/310 |
| 6,847,983 B2 | 1/2005 | Somalwar et al. | | |
| 6,985,905 B2 * | 1/2006 | Prompt et al. | ............... | 707/102 |
| 7,003,587 B1 | 2/2006 | Battat et al. | | |
| 7,540,032 B2 * | 5/2009 | Birkhoelzer et al. | .......... | 726/27 |
| 2002/0069399 A1 * | 6/2002 | Miloushey et al. | .......... | 717/108 |
| 2002/0169830 A1 | 11/2002 | Mild et al. | | |
| 2002/0188667 A1 | 12/2002 | Kirnos | | |
| 2004/0230826 A1 * | 11/2004 | Birkhoelzer et al. | ........ | 713/200 |
| 2005/0044108 A1 | 2/2005 | Shah et al. | | |
| 2005/0097086 A1 * | 5/2005 | Merchant | ........................ | 707/3 |
| 2005/0223047 A1 | 10/2005 | Shah et al. | | |
| 2005/0256907 A1 | 11/2005 | Novik et al. | | |
| 2005/0289243 A1 | 12/2005 | McInerney | | |
| 2006/0085465 A1 * | 4/2006 | Nori et al. | .................... | 707/101 |
| 2006/0089936 A1 | 4/2006 | Chalker | | |
| 2006/0155776 A1 | 7/2006 | Aust | | |

OTHER PUBLICATIONS

Geert Van Teylingen, et al., Integrating Mac® OS and NetApp Storage Integration, Configuration and Performance in Mixed File Sharing Environments. Mar. 2006. 2006 Network Appliance, Inc. http://www.netapp.com/library/tr/3472.pdf#search=%22Multi-Protocol%20Access%20to%20Files%2FDirectories%22. Last accessed Sep. 14, 2006.

(Continued)

*Primary Examiner*—Miranda Le
(74) *Attorney, Agent, or Firm*—Workman Nydegger

(57) ABSTRACT

An operating system is provided. The system includes an agent component to monitor computer activities between one or more single-item access components and one or more set-based access components. A protocol component is employed by the agent component to mitigate data access conflicts between the single-item access components and the set-based access components.

17 Claims, 10 Drawing Sheets

OTHER PUBLICATIONS

Herman Rao, et al. A transparent service for synchronized replication across loosely-connected file systems http://ieeexplore.ieee.org/iel2/3301/9923/00470456.pdf?tp=&arnumber=470456&isnumber=9923. 1995 IEEE. Last accessed Sep. 14, 2006.

Peter J. Braam. Intermezzo: File Synchronization with Intersync. Mar. 20, 2002. http://www.inter-mezzo.org/docs/intersync.pdf#search=%22synchronization%20two%20%20%22file%20system%22%22. Last accessed Sep. 14, 2006.

* cited by examiner

| Second operation (columns) → / First operation (rows) ↓ | DML Update/Delete/Rename/ReplaceItem | DML modifying Item's Security | Transacted SIAC open | Non-transacted SIAC open |
|---|---|---|---|---|
| Store API transaction modifying the item (excluding extension) is in progress | Controlled by Database transaction isolation logic | Controlled by Database transaction isolation logic | • Sharing violation if a different transaction. Enforced by Database transaction isolation logic. • Succeeds if the same transaction. | Sharing violation. Enforced by Database transaction isolation logic. |
| DML modifying Item's Security is in progress — 510 | Controlled by Database transaction isolation logic | Controlled by Database transaction isolation logic | Controlled by Database transaction isolation logic — 530 | Sharing violation. Enforced by Database transaction isolation logic. |
| Transacted SIAC handle is opened | Fails. | Allowed. AGENT Security cache is invalidated | Succeeds if the same transaction. Sharing violation for different transaction. Enforced by AGENT. | Sharing violation. Enforced by AGENT |
| Non-transacted SIAC handle is opened | Fails. Enforced by AGENT NameCache API called by Store API. | Allowed. AGENT Security cache is invalidated | Sharing violation. Enforced by AGENT. | Succeeds/Sharing violation depending on SIAC sharing modes. Enforced by AGENT. |
| A handle to a child is opened. (this row represents operations on any accessor of this item). | Basic modifications are allowed. Rename fails. Enforced by AGENT NameCache API called by Store API. Delete should not happen since Base does not allow to delete non-empty folders. | Allowed. AGENT Security cache is invalidated recursively | N/A since transacted directory opens are not allowed. | Succeeds. |

FIG. 5

| Second operation (columns) / First operation (rows) | Non-transacted SIAC Close including file delete (for files) | SIAC NtSetSecurityObject | Non-transacted SIAC directory delete | Non-transacted SIAC file/directory move/rename |
|---|---|---|---|---|
| Store API transaction modifying the item (excluding extension) is in progress | N/A since open should have failed | N/A since open should have failed | N/A since open should have failed | N/A since open should have failed |
| DML modifying Item's Security is in progress | N/A since open should have failed | N/A since open should have failed | N/A since open should have failed | N/A since open should have failed |
| Transacted SIAC handle is opened | N/A since open fails | N/A since open should have failed | N/A since open fails | N/A since open fails |
| Non-transacted SIAC handle is opened | Succeeds. | Succeeds. | Succeeds. | Succeeds. |
| A handle to a child is opened. (this row represents operations on any accessor of this item). | Succeeds. | Succeeds. AGENT Security cache is invalidated recursively | Beyond the scope of this document. | Access denied unless this child is opened by ID. Enforced by AGENT. |

FIG. 6

MULTI-PROTOCOL ACCESS TO FILES AND DIRECTORIES

BACKGROUND

Operating systems and the applications that run on them have many tasks to perform which are sometimes difficult to achieve without having conflicts between one type of application and another. At the simplest level, an operating system is responsible for two basic aspects, whereby the system manages the hardware and software resources of the system. In a desktop computer, these resources include such components as the processor, memory, disk space, and so forth, whereas on a cell phone, the resources include the keypad, the screen, the address book, the phone dialer, the battery and the network connection, for example. The operating system should provide a stable, consistent way for applications to interact with computer hardware without having to be concerned with all the details of the respective hardware.

The first task of the operating system, managing hardware and software resources, is very important, as various programs and input methods compete for the attention of the central processing unit (CPU) and demand memory, storage and input/output (I/O) bandwidth for differing purposes. In this capacity, the operating system plays the role of the system manager, making sure that each application receives the necessary resources while properly interacting with all the other applications, as well as monitoring the limited capacity of the system to the greatest benefit possible of all the users and applications. This often requires balancing needs between competing applications.

The second task of the operating system, providing a consistent application interface, is especially important if there is to be more than one of a particular type of computer using the operating system, or if the hardware making up the computer is open to change. Thus, a consistent application program interface (API) allows a software developer to write an application on one computer and have a high level of confidence that it will run on another computer of the same type, even if the amount of memory or the quantity of storage is different on the two machines, for example. Even if a particular computer is unique, the operating system can ensure that applications continue to run when hardware upgrades and updates occur. This is by design since the operating system and not the application is charged with managing the hardware and the distribution of its resources.

Within the broad family of operating systems, there are generally four types, categorized based on the types of computers they control and the sort of applications they support. These categories can include:

Real-time operating system (RTOS)—Real-time operating systems are used to control machinery, scientific instruments and industrial control systems. An RTOS typically has very little user-interface capability, and generally no end-user utilities, since the system will be considered an embedded system when delivered for use. An important part of the RTOS is managing the resources of the computer so that a particular operation executes in about the same amount of time every time it occurs. For example, in a complex machine/controller scenario, having a part move more quickly because system resources are available may be just as catastrophic as having it not move at all due to the system being busy.

Another type of operating system includes single-user, single task. As the name implies, this operating system is designed to manage the computer so that one user can effectively do one thing at a time. The Palm OS for Palm handheld computers is but one example of a modern single-user, single-task operating system.

Similarly, a single-user, multi-tasking system may be provided. This is the type of operating system most people use on their desktop and laptop computers today. The most popular of these are Microsoft's Windows and Apple's MacOS platforms that are both examples of operating systems that allow a single user to have several programs in operation at the same time. For example, it's common for a user to be writing a note in a word processor while downloading a file from the Internet while printing the text of an e-mail message.

Multi-user is till yet another type of operating system. A multi-user operating system allows many different users to take advantage of the computer's resources simultaneously. The operating system must make sure that the requirements of the various users are balanced, and that each of the programs they are using has sufficient and separate resources so that a problem with one user doesn't affect the entire community of users. Some examples include Unix, VMS and mainframe operating systems, such as MVS.

With respect to single-user, multi-tasking systems, conflicts can exist for applications that were created under previous designs of the operating systems and in view of newer designs. Thus, these applications often follow the rules of the previous designs from an operational standpoint yet still need to operate with newer systems, applications, and contexts. In one example, current or legacy "File Systems" generally only support a single-item access API to create/modify/read file/directory data. However, newer, richer storage platforms may employ multi-item access rules and expose additional API sets which can be used to create/modify/read manipulate file/directory data as well. Given this requirement between older and newer applications running on the same system, there is a need to facilitate cooperation between such applications.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A multi-access protocol is provided to facilitate cooperation and interaction between legacy style applications developed under one type of operating system framework. Previous applications (e.g., handle-based applications) were developed under the constraint that stored data items would be accessed a single item at a time. Modern systems have developed a richer architecture whereby multiple data items or a set of items can be accessed concurrently. The multi-access protocol operates to guide data interactions between such legacy applications and advanced operating systems where data access conflicts may exist between single item access rules expected by previous applications and the more flexible multi-item access allowances of the newer systems. Richer access capabilities such as set-based or multi-item access are often facilitated through different access paths. Existence of multi-access paths includes coordination of data access to ensure correctness and consistency of data via the multi-access protocol. Such protocol can be employed with an agent component that oversees operations between single-item access and multi-item access components. For example, one or more rules can be enforced by the agent that may allow a given operation to succeed, fail with an error, or deny access when a possible conflict is detected. The agent can also facilitate such aspects as controlling system cache resources by mitigating stale data that may reside in the cache and resolving respective cache conflicts that may occur when the same data items are accessed concurrently.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 5 and 6 illustrate example multi-protocol access semantics or rules.

DETAILED DESCRIPTION

A multi-protocol access system is provided that enables applications developed under one operating system framework to interact with applications developed under another framework. In one aspect, an operating system is provided. The system includes an agent component to monitor computer activities between one or more single-item access components and one or more set-based access components, where set-based refers to the ability to access multiple data items at a time. A protocol component is employed by the agent component to mitigate data access conflicts between the single-item access components and the set-based access components.

As used in this application, the terms "component," "item," "protocol," "agent," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
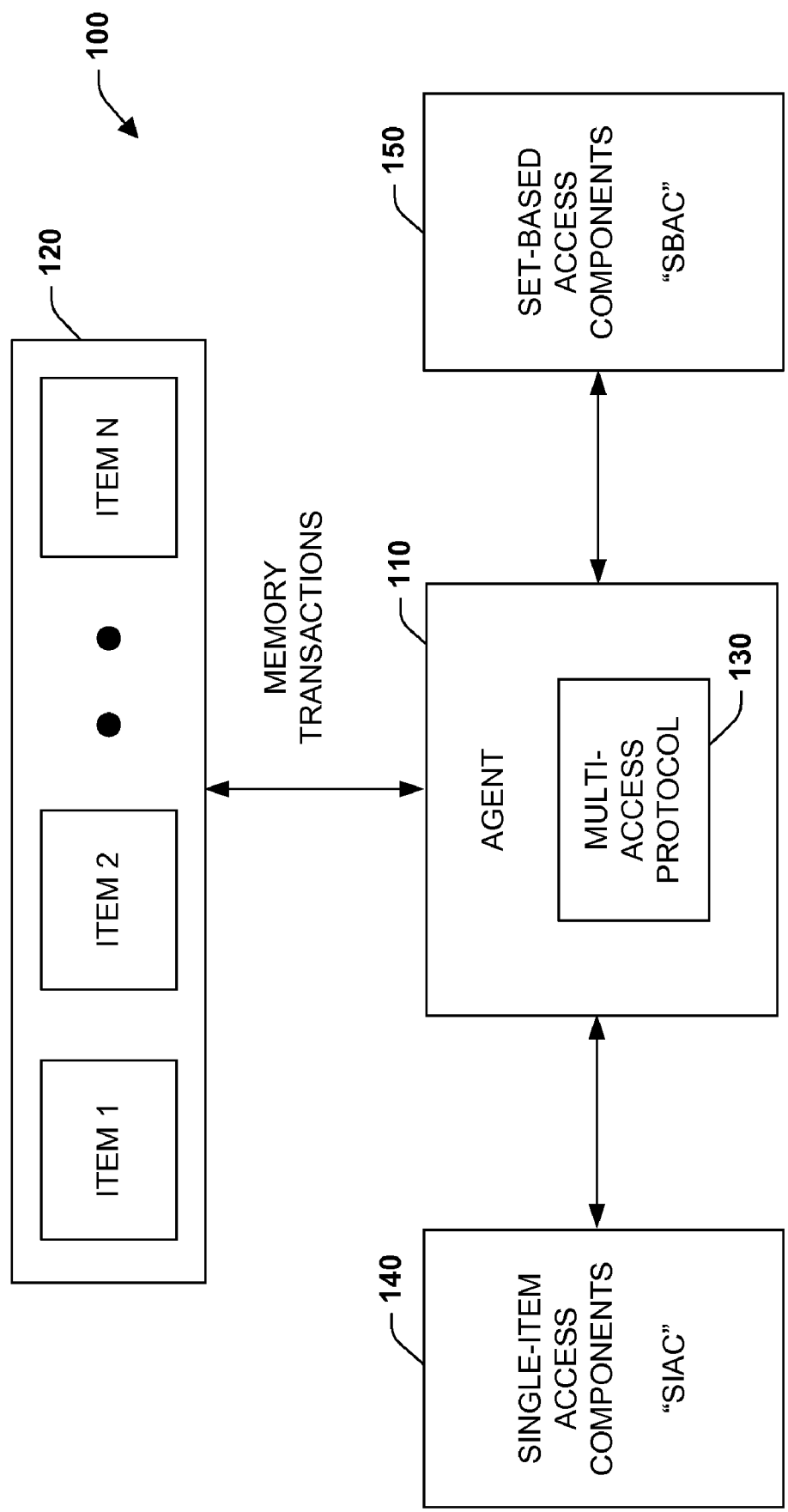
FIG. 1 is a schematic block diagram illustrating a multi-protocol access system.

Referring initially to FIG. 1, a multi-protocol access system 100 is illustrated to facilitate cooperation and interactions between disparate applications. The system 100 includes an agent 110 that is employed to monitor and control access to one or more data items 120. This is achieved by utilizing a multi-access protocol 130 that defines one or more rules for how disparate systems can access the data items 120. In this case, disparate implies that at least one system desires access to the data items 120 according to one type of system or rules and at least one other system or application desires access to the data items 120 according to an alternative set of rules. As can be appreciated, the multi-access protocol 130 can be employed to control access between two or more differing systems employing two or more access rules or principles for operating with the data items 120. The data items 120 can be substantially any type of data structure including single memory locations, arrays, files, directories, applications, relational database structures, objects, classes, methods, functions, and so forth.

As shown, one type of system or application to operate on the data items 120 includes one or more single-item access components 140 (also referred to by acronym SIAC). Such SIAC 140 are known for being able to operate and process one data item 120 at a time and can also be referred to as handle-based systems (e.g., Win32). A handle is generally a variable that identifies an object and provides an indirect reference to an operating system resource. A handle can be variable of type long which uniquely identifies any object such as forms, desktop items, menus, or in other words a handle is a unique identifier for each of these objects. Typically application windows in an SIAC 140 operating system are identified by a handle. For example, a desktop window can have a handle, a Visual Basic form displayed in an application can have a handle, and even the controls on a form, which are themselves actually windows, can have respective handles.

Handle-based applications or the SIAC 140 have difficulty with applications that support other protocols such as one or more set-based access components 150 (also referred to by acronym SBAC) that may also access the data items 120. Set-based access components 150 can be associated with a different style of operating system framework that allows multiple data items 120 to be accessed concurrently. Thus, the SBAC 150 can cause problems for the SIAC 140 when both types of applications are attempting access to the data items 120 in a concurrent manner. Generally, set-based access is associated with operating system frameworks (e.g., WINFS) adapted with relational database capabilities that allow multiple data items 120 to be accessed. The multi-access protocol 130 provides rules and mapping to allow the SIAC 140 and the SBAC 150 to co-exist on the same platform or across the same memory structures if remote web-based applications are employed. This can include having the agent 110 monitor the data items 120 and apply the rule or rules from the multi-access protocol 130 for a given type of memory access. Various example protocol rules/semantics are shown and described in more detail below with respect to FIGS. 5 and 6.

In general, some "File Systems" only support SIAC 140 application programming interfaces (APIs) to create/modify/read file/directory data. Richer storage platforms associated with the SBAC 150 expose additional API sets which can be used to create/modify/read manipulate file/directory data as well. Given this, the new storage platforms can define multi-protocol access (SIAC and SBAC API as an example) semantics at 130 for file/directory data, for example. As an example, a file could be opened for write purposes where the open allows shared_write via the SIAC 140, where the multi-access protocol 130 allows another application to modify the file via the SBAC 150 API. One challenge here is that SIAC API may be "handle" based where the SBAC 150 is not as noted above. There are a plurality of combinations for accessing the data items 120 via the SIAC 140 and SBAC 150 where such combinations are described in more detail below with respect to FIGS. 5 and 6. Thus, in one example, the multi-access protocol 130 allows the system 100 to synchronize the SIAC 140 and the SBAC 150 at an agent layer in user mode (or other modes), where user mode is a system state for computer users and public access. In this mode, changes made (editing/deleting/moving/renaming files, installing/upgrading/removing software, and so forth) are temporary and when the system 100 is rebooted, items return to their original state. In another aspect, the system 100 can be employed to control memory access in a computer. This includes means for monitoring (e.g., agent component 110) computer memory access to data items 120 between one or more single-item access components 140 and one or more multiple-item access components 150. This also includes means for controlling (e.g., multi access protocol 130) memory conflicts at the data items 120 in view of the single-item access components 140 and the multiple-item access components 150.

Figure 2:
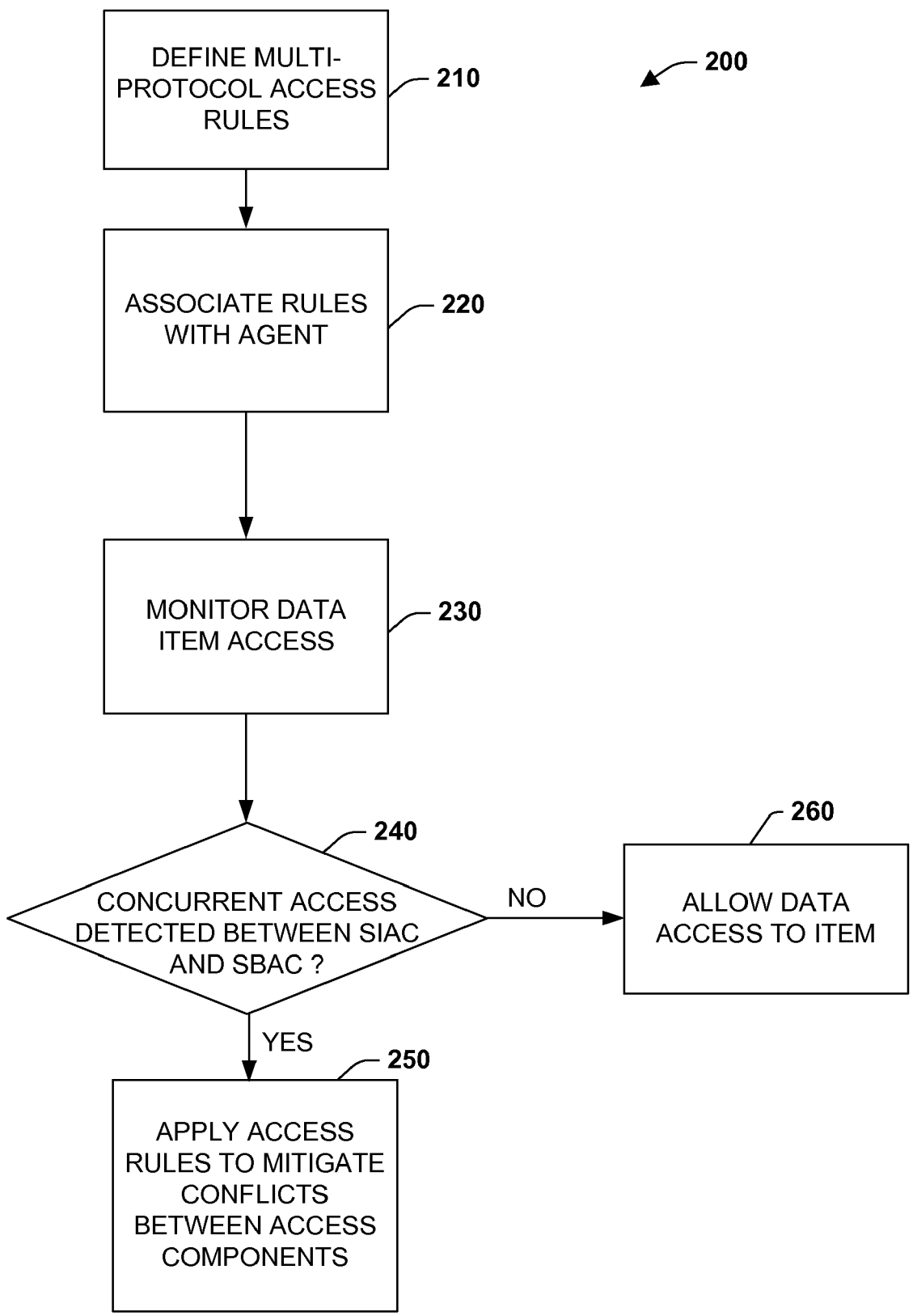
FIG. 2 is a flow diagram that illustrates a process for multi-protocol data access.

FIG. 2 illustrates exemplary processes 200 for multi-protocol data access. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 210 of FIG. 2, one or more multi-protocol access rules are defined. These can include rules for how access is controlled, denied, allowed, and so forth between single-item access components (SIAC) and set-based access components (SBAC). Specific example rules for controlling and managing memory access will be described in more detail below with respect to FIGS. 5 and 6. At 220, the rules defined at 210 are associated with an agent or agent layer. The agent is employed to detect memory accesses via one memory access protocol versus another and then apply the appropriate rule defined at 210 in view of the detected memory access. In order to detect such access, the agent monitors one or more data items at 230. Such monitoring can occur as part of underlying operating system procedures that execute while applications are operating respective applications tasks. This monitoring can detect activities or conflicts whenever a given application performs a memory access for example, where memory access includes reading and writing to respective files. Generally, the multi-protocol access rules defined at 210 are employed when two or more applications attempt a concurrent write, change, or update to a data item.

At 240, a decision is made as to whether or not a current access has been detected between a single-item access component (SIAC) and a set-based access component (SBAC). If a concurrent access is detected at 240, one or more access rules are applied at 250 to mitigate potential conflicts between item update activities. This can include various procedures such as raising error flags, denying permission to a file, holding off one application temporarily while another application operates on an item, granting permission to a file and so forth as will be described in more detail below. If no concurrent access is detected at 240, the process allows a data item to be accessed at 260 without further restriction.

Figure 3:
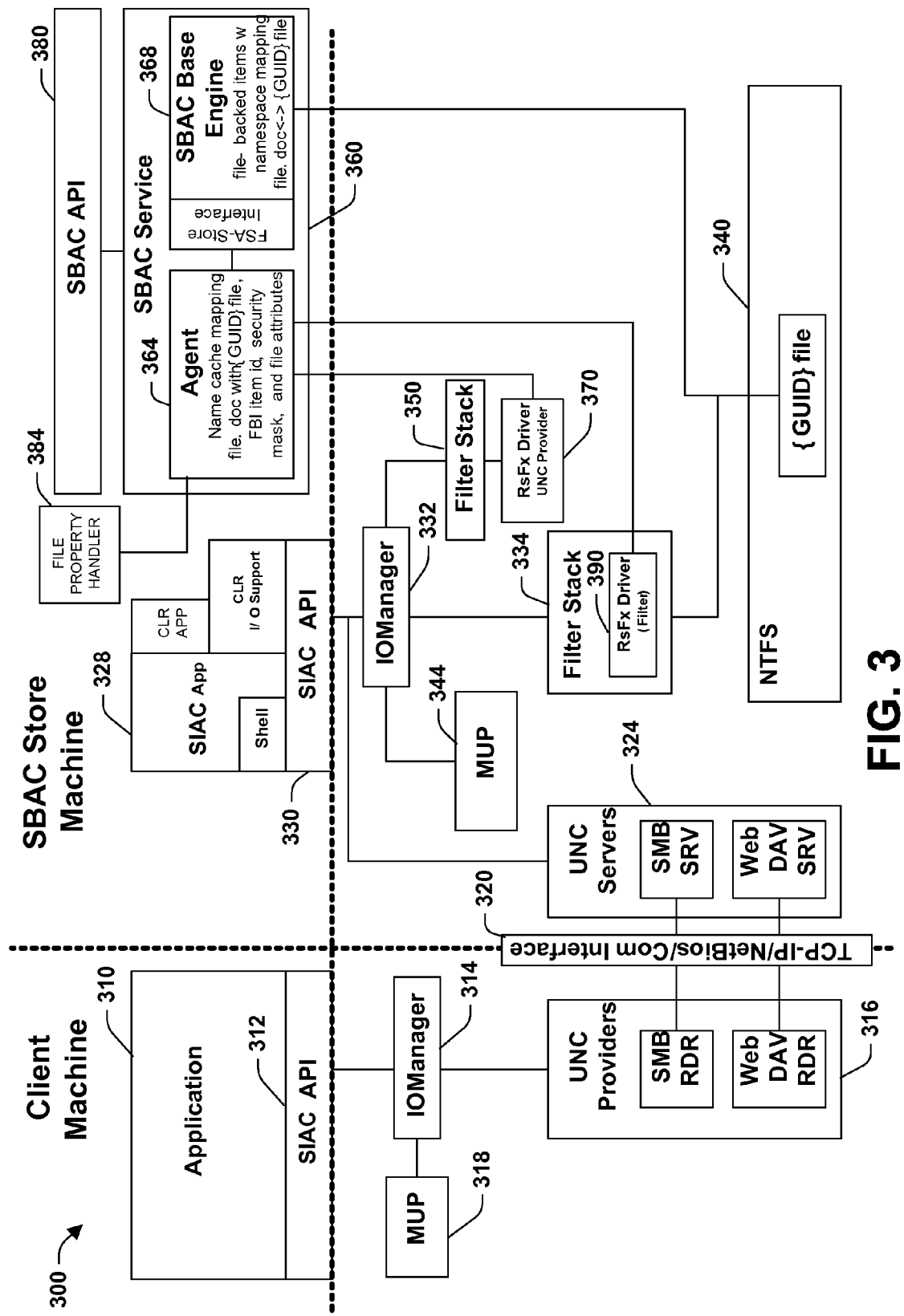
FIG. 3 is a schematic block diagram that illustrates an example system for multi-protocol access.

Referring now to FIG. 3, an example system 300 illustrates multi-protocol processing. The system 300 can include a client application 310 having an SIAC API 312 that communicates via an I/O manager with a universal naming convention provider (UNC) 316 that is associated with an MUP component 318 (Multiple UNC Provider). These components communicate across an interface 320 to UNC servers 324. Also, an SIAC application may communicate via an SIAC API 330 via an I/O manager 332 through a filter stack 334 to a file system 340. Other components may include an MUP 344 and another filter stack 350. An SBAC service 360 having an agent 364 and engine 368 can communicate with the filter stack 334, file system 340, and driver 370. The SBAC service 360 can also be associated with an SBAC API 380 and file property handler 384.

In general, File Backed Items (FBIs) in an SBAC system are regular items that have real data streams associated with them. The SBAC provides SIAC access to such streams for the purpose of application compatibility via the agent 364. Generally, File I/O operations (e.g., NtCreateFile, NtReadFile, NtWriteFile, and so forth) are handled be the Driver 370 and Agent 364. Since all SIAC File I/O operations (e.g., CreateFile, ReadFile, WriteFile, GetFileAttributes and so on) are translated into appropriate File I/O operations, these components can be referred top a "SIAC interface" components. The driver 370 and driver 390 is a SIAC file system driver employed to intercept namespace- and property-related operations (opening/creating files or directories, getting/setting file attributes and timestamps, renaming/deleting files or directories and so forth) and redirecting such requests to a user-mode agent. The agent 364 provides the proper semantics, for example, by calling the appropriate SBAC stored procedures to create a new file/directory or by querying file attribute from SBAC and returning them to the driver 370 or 390. Accordingly, SIAC semantics define that files, directories, or other structures have a set of properties associated with them which are described in more detail below with respect to FIG. 4.

Figure 4:
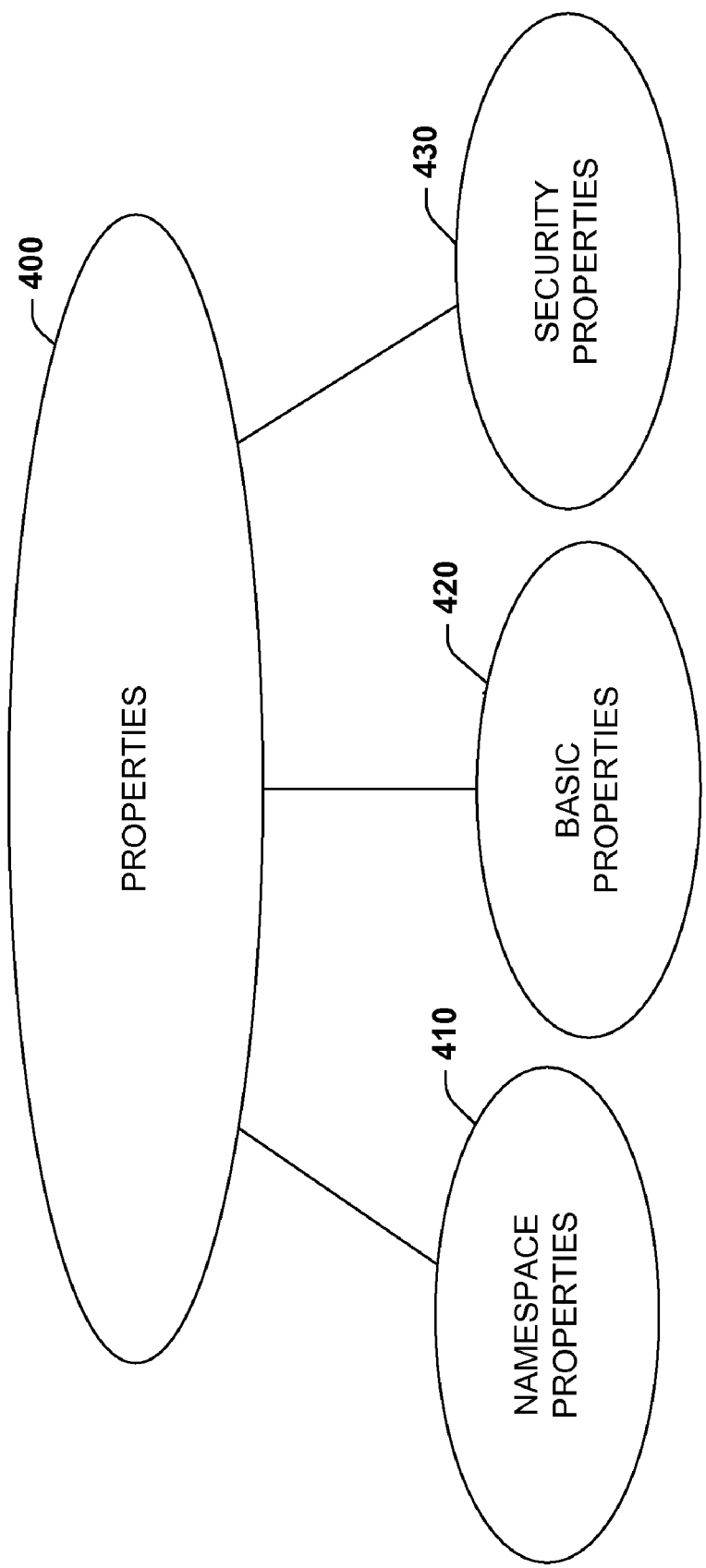
FIG. 4 illustrates example properties that can be processed by an agent component.

Turning to FIG. 4, example properties 400 that can be processed by an agent component are illustrated. SIAC semantics define that each file/directory has a set of properties associated with it. These properties can be split into at least 3 groups including: NameSpace properties 410, Basic properties 420 and Security properties 430. Table 1, Table 2 and Table 3 below show these properties 410-430, respectively.

TABLE 1

NameSpace properties 410

| Property Name | Description |
|---|---|
| PathName | The pathname uniquely identifying the file/directory |
| ItemId | Identity key of the item in the richer storage model |

TABLE 2

Basic Properties 420

| Property Name | Description |
|---|---|
| Attributes | A combination of the following flags (not exhaustive list): FILE_ATTRIBUTE_READONLY FILE_ATTRIBUTE_HIDDEN FILE_ATTRIBUTE_SYSTEM FILE_ATTRIBUTE_ARCHIVE FILE_ATTRIBUTE_TEMPORARY |

TABLE 2-continued

Basic Properties 420

| Property Name | Description |
| --- | --- |
| | FILE_ATTRIBUTE_DIRECTORY |
| | FILE_ATTRIBUTE_NORMAL |
| CreationTime | Date/time when the item was created |
| LastModificationTime | Date/time when the item was modified |
| LastWriteTime | Date/time when the stream was last modified |
| LastAccessTime | Date/time when the item was accessed with the 2 hours (or other time) granularity |
| FileSize | The size of the file |
| AllocationSize | The real disk space taken by the file |

TABLE 3

Security properties 430

| Property Name | Description |
| --- | --- |
| Security Descriptor | The security descriptor associated with the file/directory. |

For performance reasons, an agent maintains a cache of properties 400 associated with each file or directory accessed through the SIAC interface. When a file or a directory is opened through the SIAC interface, the agent retrieves the item properties and stores them in appropriate memory objects to avoid roundtrips to the SBAC if it needs these properties again. After the file handle is closed, the memory objects containing the file properties are placed into a cache (called NameCache) and are kept there until the expiration period passes. If the same file/directory is opened again, the agent reuses the cached objects and restarts the aging process after the last handle is closed. It is noted that the agent may not cache security descriptors directly. Instead, it caches so-called per-user "maximum access mask" which is the result of evaluating of a security descriptor for the given user. The security cache is a slightly separate cache and can be invalidated independently.

Since file backed items (FBI's) are regular SBAC items, there are at least two ways to modify an FBI: Store API update (including SBAC API) and SIAC update. Generally, the agent allows at least two types of SIAC operations: regular, when a file/directory is opened by its name; and an open by item id (OBID), when an encoded item id is used as the pathname, where OBID operations can modify a stream. Namespace operations (create a new item, delete or rename an existing item) are generally not allowed. Respective OBID operations can be: Transacted (when an appropriate database transaction information is passed to the agent); and Non-transacted. Generally there are at least three ways to modify an FBI including: Store API; Transacted SIAC access (no namespace operations); and Non-transacted SIAC access (any File I/O operations).

As noted above, the agent can cache properties of files/directories accessed through the SIAC interface. Data in a cache entry corresponding to an item may become stale when, for example:

One of the cached properties of a cached item is updated through Store API and the transaction commits.

The item was modified by a transacted SIAC operation some time ago and the transaction commits.

The item can be deleted through Store API and the transaction commits.

The item can be renamed through Store API and the transaction commits.

Any item in the path of the cached item is renamed through Store API and the transaction commits.

FIGS. 5 and 6 illustrate a protocol or semantic matrix 500 and matrix 600 respectively. Rows in the matrixes 500 and 600 represent a first operation and columns in the matrixes 600 represent a subsequent operation or file system access. With respect to both the matrix 500 and 600, respective row or first operation sequences can include from top to bottom:

Store API transaction modifying the item; Data Manipulation Language (DML) modifying an item's security is in progress; Transaction SIAC handle is opened; Non-transacted SIAC handle is opened; and a handle to a child is opened. Across the top of the matrixes 500 and 600 represent the second operation sequence. For the matrix 500, the column headings are: DML Update/Delete/Rename/Replace Item; DML modifying item's security; Transacted SIAC open; and Non-transacted SIAC open. Across the top of the matrix 600 in FIG. 6, are: Non-transacted SIAC close including file delete; SIAC set security object; Non-transacted SIAC directory delete; and non-transacted file/directory/move/rename operation. By observing where the rows and columns intersect on the matrixes 500 and 600, one can observe the applicable rule or semantic for a given operation. For example, observing the matrix 500 of FIG. 5, if a transacted SIAC handle is opened as a first operation at 510, and a DML modifying item's security is attempted as a second operation at 520, then the semantic is illustrated at 530 showing that this transaction is allowed and an agent security cache is invalidated.

For the purposes of brevity, all first operation/second operation combinations will not be described herein, however semantics can be determined by starting to the left of the matrix at a row designator identifying a first operation, identifying a second operation along the top of the matrixes, and reading the resultant semantic from the intersection of the row (first operation) and column (second operation). As illustrated some example semantics include: controlled by server logic, operation fails, operation succeeds, operation allowed, sharing violation enforced by agent or server, access denied, security cache invalidated, and so forth.

Figure 7:
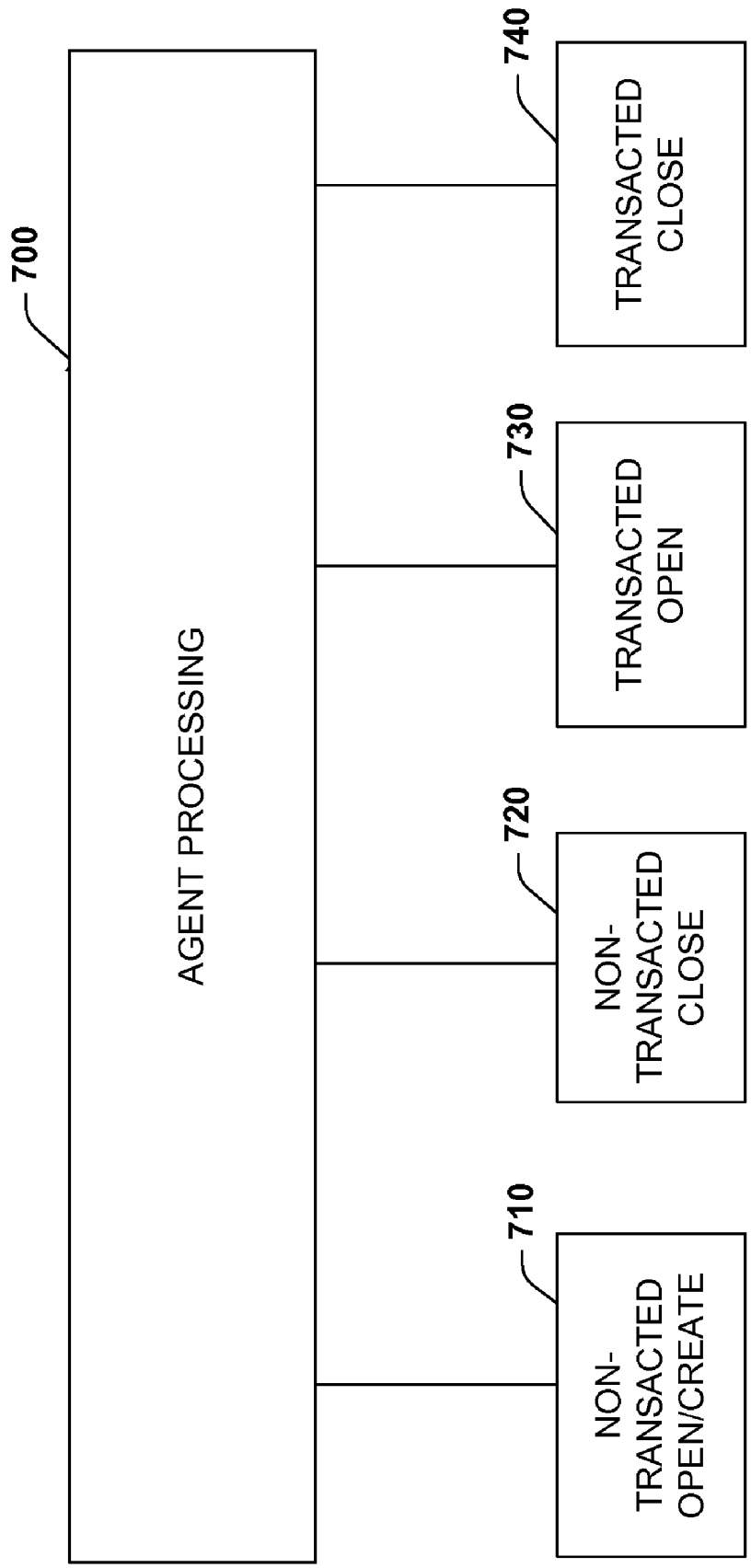
FIG. 7 illustrates example agent processing considerations.

FIG. 7 illustrates example agent processing considerations 700. At 710, agent processing 700 can include an SIAC Non-Transacted Open/Create operation. When a file/directory is opened in non-transacted mode, an agent:

1. Calls the e.g., GetItem (example API store location) stored procedure (SP). This SP acquires a statement-level share lock on the appropriate row in the item table in the context of its own transaction. If this lock conflicts with exclusive lock taken on the same row, the operation fails.
2. If GetItem succeeds, the agent fills the appropriate cache entry and succeeds the operation.

Proceeding to 720, an SIAC Non-Transacted Close is considered. On close, the agent:

1. Checks is any properties have been changed and calls SetBasicProperties.
2. SetBasicProperties updates the properties in the store in the context of its own transaction.
3. SetBasicProperties fails, the agent retries SetBasicProperties some time later.

At 730, an SIAC Transacted Open is considered. When a file is opened in transacted mode, the agent:

1. Stores the transaction context for further operations.
2. Calls the GetItem stored procedure passing the transaction context. Further operations are performed in the context of this transaction.
3. GetItem acquires exclusive lock on the appropriate row in the item table. The operation fails if there is lock conflict.

4. GetItem succeeds, the agent fills the appropriate cache entry and succeeds the operation. The entry is marked as "transacted" so further transacted opens will succeed or fail depending on the transaction context passed to the agent. The agent should allow those transacted opens that are made in the same transaction context. This implies that if the file is opened in transacted mode, updates made in the context of another transaction will fail. It is noted that:

Employing an exclusive lock helps prevent concurrent updates from Store API or concurrent non-transacted opens.

Exclusive lock is held until the end of the transaction, so no other updates except made in the context of the same transaction should be allowed. This ensures that the agent does not create a cache entry that might become stale on commit.

At 740, an SIAC Transacted Close is considered. On close, the agent:
1. Checks if any properties have been changed and calls SetBasicProperties passing the transaction context stored at open time.
2. SetBasicProperties updates the properties in the store in the context of the given transaction context.
3. If update fails for any reasons, the agent ignores the respective error. As can be appreciated, other processing can be provided by the agent than the examples outlined in FIG. 7.

Figure 8:
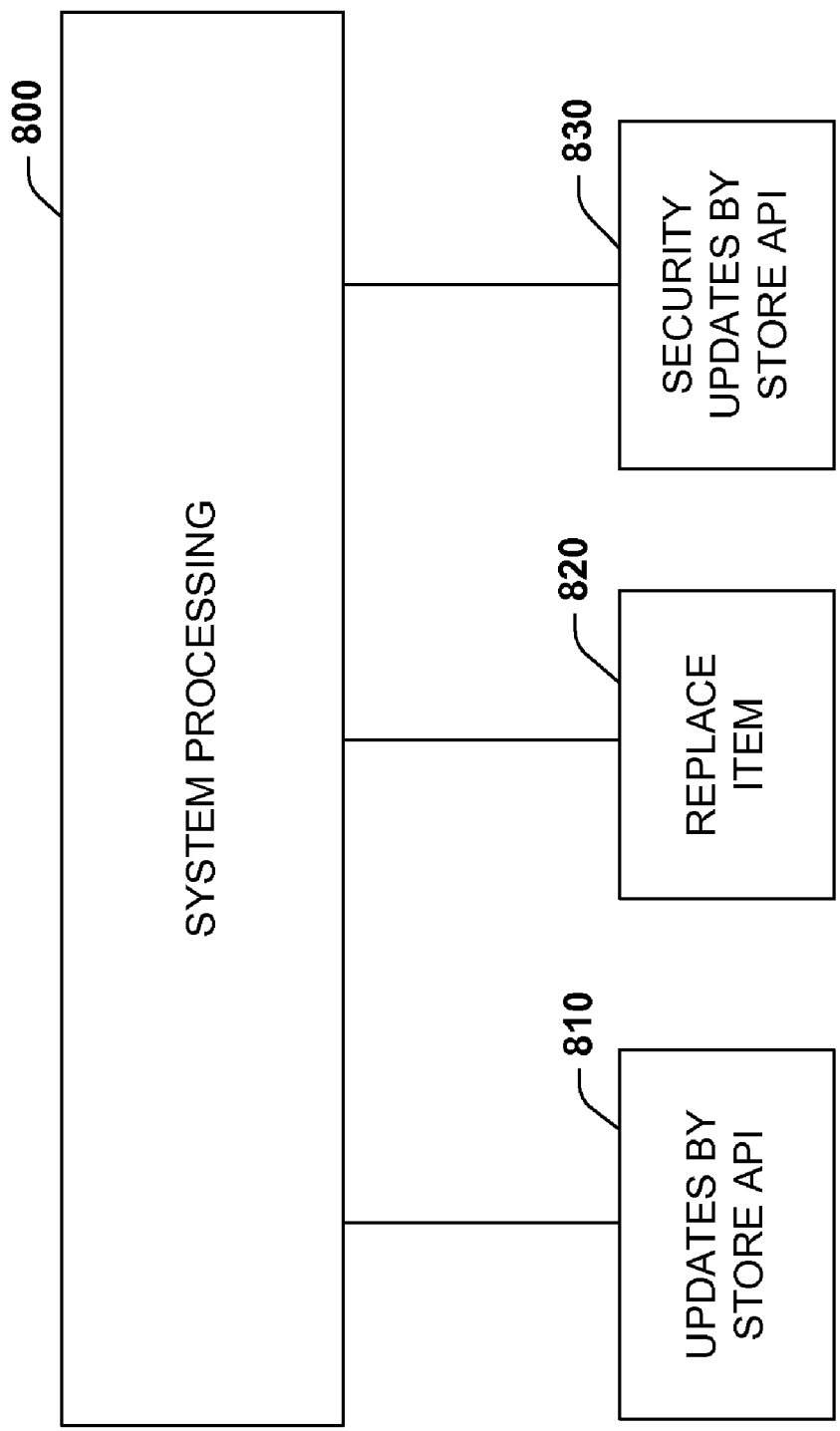
FIG. 8 illustrates example system processing considerations.

Turning to FIG. 8, example system processing considerations 800 are illustrated that can be applied with the agent processing described above with respect to FIG. 7. At 810, updates by a Store API are considered. If the system needs to update any property that might potentially be cached by the agent, the system:
1. Acquires exclusive lock on the appropriate row in the item table. If there is an SIAC open (whether transacted or non-transacted) in progress, this operation will fail because of lock conflict or wait until the row gets unlocked.
2. Calls the provided invalidate_name_cache_entries SP which in turn calls the agent API to invalidate the cache entry (entries). If the agent API indicates that the entry can not be invalidated (because an SIAC client keeps a handle opened), the update should fail.
3. Updates the properties.
4. Commits the transaction.

It is noted that SIAC opens may not be allowed until the transaction commits. This ensures that the agent does not recreate a cache entry that will become stale on commit. The store API updates are not allowed if the file is opened by an SIAC client, even if it is opened in the context of the same transaction. This is performed because the agent may not invalidate the cache entry while it is still in use.

At 820, a Replace Item is considered. In this aspect, ReplaceItem should guarantee that it does not modify the potentially cached properties. At 830, security updates by the store API are considered. If the system updates security of a folder or an FBI, it:
1. Calls the provided invalidate_security_cache_entry SP which in turn calls the agent API to invalidate the security cache entry (entries).
2. Updates security settings of the item(s).
3. Commits the transaction.

It is noted that SIAC opens should not be allowed until the transaction commits. This will ensure that the agent does not repopulate cache entries that may become stale on commit. It is to be appreciated that the possible actions of the agent and the associated system described above are exemplary in nature and that other combinations of actions are possible. Similarly, the matrixes shown in FIGS. 6 and 7 described but a subset of possibilities for controlling memory access between at least two disparate operating system frameworks and API sets. Thus, substantially any protocol that is employed to facilitate cooperation and interactions between disparate operating system and API frameworks are considered contemplated by the exemplary concepts and broader principles described herein.

Figure 9:
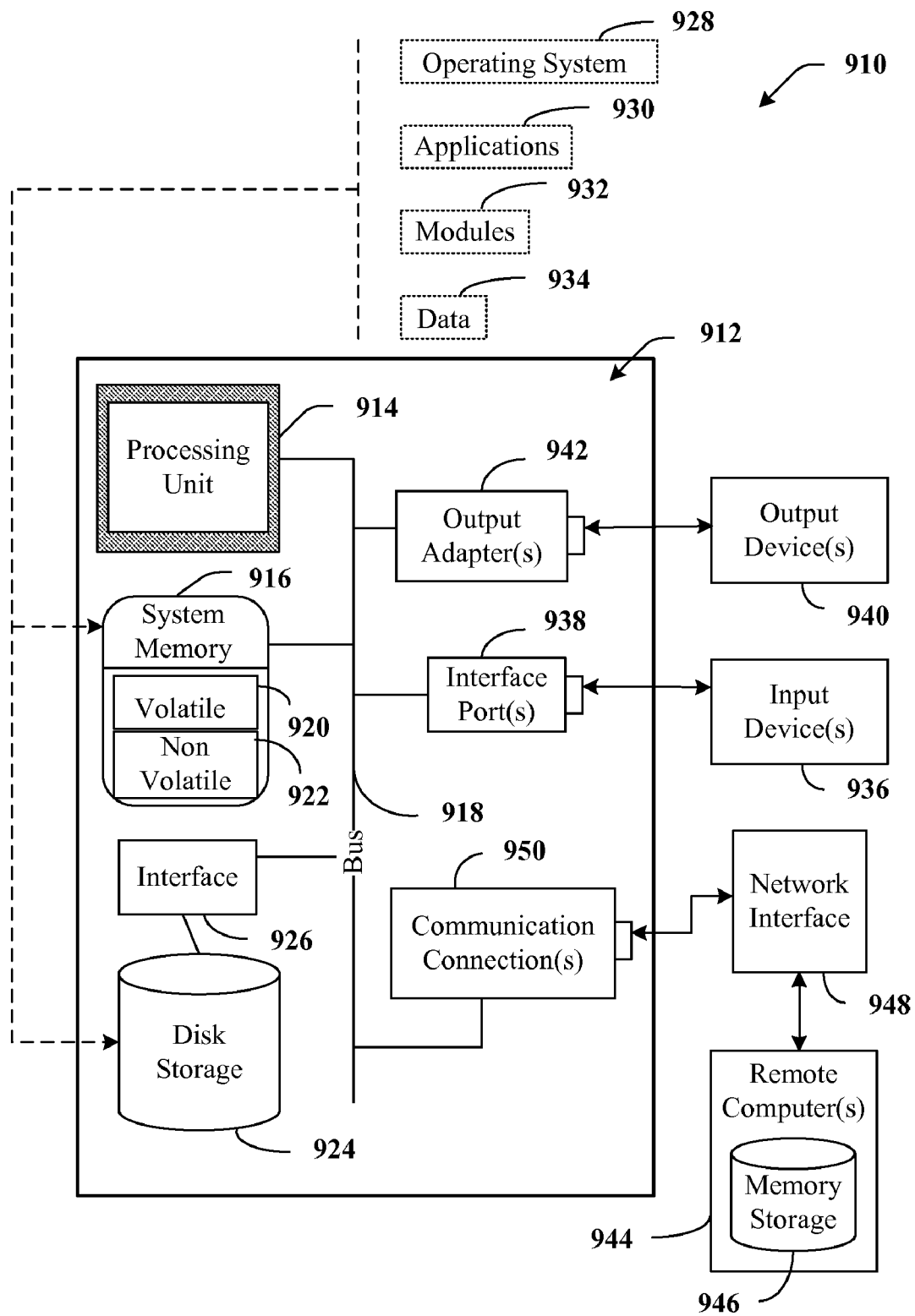
FIG. 9 is a schematic block diagram illustrating a suitable operating environment.
Figure 10:
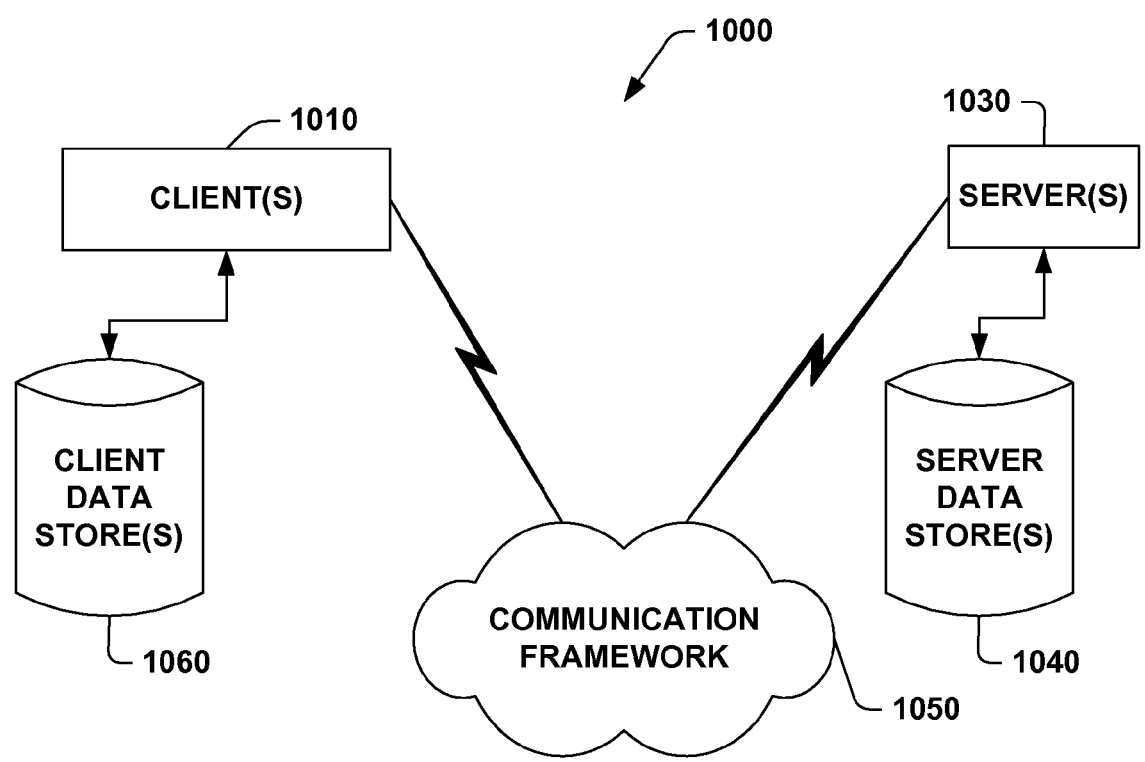
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer storage media having stored thereon an operating system that resolves conflicts between single-item access applications and set-based access applications, the operating system comprising:

an agent component, wherein the agent component is configured to:
monitor computer activities on a computing system, wherein the computer activities include activities involving data item access requests handled between one or more single-item access applications (SIAA) and one or more set-based access applications (SBAA), wherein monitoring the computer activities occurs as part of underlying operating system procedures that execute while applications operate in respective application tasks, and wherein:
  an SIAA is a legacy application developed under a type of operating system framework allowing the SIAA to access only a single data item at a time; and
  an SBAA is an application through which multiple data items, or a set of multiple data items, are concurrently accessible; and
  maintain a transaction matrix to control memory interactions, wherein the transaction matrix comprises a first operation and a second operation subsequent to the first operation, wherein:
    the first operation in the transaction matrix includes two or more of: a Store API transaction modifying an item; a Data Manipulation Language (DML) modifying an item's security; a Transaction SIAC handle is opened; a Non-transacted SIAC handle is opened; a handle to a child is opened; and
    the second operation in the transaction matrix includes two or more of: a DML Update/Delete/Rename/Replace Item has occurred; a DML modifying item's security has occurred; a Transacted SIAC open has occurred; or a Non-transacted SIAC open has occurred;
  a protocol component employed by the agent component to mitigate data access conflicts resulting from communications between the agent component and the SIAA and the SBAA, wherein the data access conflicts result from the SIAA being configured to allow access to only a single data item at a time while the SBAA is configured to allow concurrent access to multiple data items, and wherein the protocol component is further configured to synchronize the SIAA and the SBAA with the agent component in a user mode; first application programming interface (API) associated with the SIAA, wherein the first API is handle-based; a second API associated with the SBAA, wherein the second API is not handle-based; and
  at least one universal naming component associated with the SIAA or the SBAA.

2. The system of claim 1, wherein one or more SIAA are associated with a handle based operating system.

3. The system of claim 1, wherein one or more SBAA are associated with an operating system having relational database memory storage capability.

4. The system of claim 1, wherein the computer activities are associated with memory updates to one or more data items.

5. The system of claim 4, wherein the data items are associated with one or more of single memory locations, arrays, files, directories, names, applications, relational database structures, objects, classes, methods, or functions.

6. The system of claim 1 further comprising at least one application programming interface (API) associated with one or more of the SIAA and at least one API associated with one or more of the SBAA.

7. The system of claim 1, further comprising at least one driver component associated with one or more of the SBAA.

8. The system of claim 1, further comprising at least one I/O manager component associated with the SIAA or the SBAA.

9. The system of claim 1, further comprising a cache component that is processed by the agent component.

10. The system of claim 1, wherein the agent component is configured to process at least one property associated with a data item, the at least one property including at least one of a namespace property, a basic property, or a security property.

11. The system of claim 1, wherein one or more of the SIAA components are associated with at least one of a non-transacted open or create operation, a non-transacted close operation, a transacted open operation, or a transacted close operation.

12. The system of claim 1, wherein one or more of the SBAA components are associated with at least one of updating an API store, replacing an item, or providing security updates to the API store.

13. A computer-implemented method for controlling memory access in a manner that resolves conflicts between single-item access applications and set-based access applications, the method comprising:
  defining one or more multiple-protocol access rules that control how access to data items is controlled, denied, and allowed;
  associating the one or more multiple-protocol access rules with an agent component, wherein the agent component maintains a transaction matrix to control memory interactions, and wherein the transaction matrix comprises a first operation and second operation subsequent to the first operation, wherein;
    the first operation in the transaction matrix includes two or more of a Store API transaction modifying an item, a Data Manipulation Language (DML) modifying an item's security; a Transaction SIAC handle is opened; a Non-transacted SIAC handle is opened; a handle to a child is opened; and
    the second operation in the transaction matrix includes two or more of a DML Update/Delete/Rename/Replace Item has occurred; a DML modifying item's security has occurred; a Transacted SIAC open has occurred or a Non-transacted SIAC open has occurred;
  deploying the agent component, wherein deploying the agent component causes the agent component to monitor memory locations in view of the multiple-protocol access rules, wherein monitoring memory locations in view of the multiple-protocol access rules comprises:
    detecting a first memory access request via a first memory access protocol, and determine that the first memory access request is by a single-item access application (SIAA), wherein an SIAA is a legacy application developed under a type of operating system framework that allows the SIAA to access only a single data item at a time; and
    detecting a second memory access request via a second memory access protocol, and determine that the second memory access request is by a set-based access application (SBAA), wherein an SIAB is an application through which multiple data items, or a set of multiple data items, are concurrently accessible;
  defining one or more multi-access rules that control access to the memory locations and synchronize the SIAA and the SBAA with the agent component in a user mode; and
  accessing at least one universal naming component associated with the SIAA or the SBAA.

14. The computer-implemented method of claim 13, further comprising providing at least one application programming interface for the multiple-protocol access rules.

15. The computer-implemented method of claim 13, further comprising determining that the SIAA and SBAA are requesting concurrent access to a data item and, in response, generating a fault, a success flag, or a sharing violation while monitoring memory locations.

16. The computer-implemented method of claim 13, wherein monitoring memory locations further includes monitoring at least one data item property to control access to the memory.

17. One or more computer storage media having stored thereon an operating system that resolves conflicts between single-item access applications and set-based access applications, the operating system comprising:

an agent component, wherein the agent component is configured to:

monitor computer activities on a computing system, wherein the computer activities include activities involving data item access requests handled between one or more single-item access applications (SIAA) and one or more set-based access applications (SBAA), wherein monitoring the computer activities occurs as part of underlying operating system procedures that execute while applications operate in respective application tasks, and wherein:

an SIAA is a legacy application developed under a type of operating system framework allowing the SIAA to access only a single data item at a time; and an SBAA is an application through which multiple data items, or a set of multiple data items, are concurrently accessible; and maintain a transaction matrix to control memory interactions, wherein the transaction matrix comprises a first operation and a second operation which is subsequent to the first operation, wherein:

the first operation in the transaction matrix includes each of: a Store API transaction modifying an item; a Data Manipulation Language (DML) modifying an item's security; a Transaction SIAC handle is opened; a Non-transacted SIAC handle is opened; and a handle to a child is opened; and the second operation in the transaction matrix includes each of: a DML Update/Delete/Rename/Replace Item has occurred; a DML modifying item's security has occurred; a Transacted SIAC open has occurred; and a Non-transacted SIAC open has occurred;

at east one universal naming component associated with the SIAA or the SBAA;

a protocol component employed by the agent component to mitigate data access conflicts resulting from communications between the agent component and the SIAA and the SBAA, wherein the data access conflicts result from the SIAA being configured to allow access to only a single data item at a time while the SBAA is configured to allow concurrent access to multiple data items, and wherein the protocol component is further configured to synchronize the SIAA and the SBAA with the agent component in a user mode;

an I/O manager component associated with both the SIAA and the SBAA;

a first application programming interface (API) associated with the SIAA, wherein the first API is handle-based; and a second API associated with the SBAA, wherein the second API is not handle-based.

* * * * *

UNITED STATES PATENT AND TRADEMARK OFFICE
CERTIFICATE OF CORRECTION

| | | |
|---|---|---|
| PATENT NO. | : 7,716,247 B2 | Page 1 of 1 |
| APPLICATION NO. | : 11/612105 | |
| DATED | : May 11, 2010 | |
| INVENTOR(S) | : Arkadi Brjazovski et al. | |

It is certified that error appears in the above-identified patent and that said Letters Patent is hereby corrected as shown below:

In column 13, line 55, in Claim 6, delete "claim 1" and insert -- claim 1, --, therefor.

In column 14, line 24, in Claim 13, delete "wherein;" and insert -- wherein: --, therefor.

In column 14, line 26, in Claim 13, delete "item," and insert -- item; --, therefor.

In column 14, line 32, in Claim 13, delete "of" and insert -- of: --, therefor.

In column 14, line 35, in Claim 13, delete "occurred" and insert -- occurred; --, therefor.

In column 16, line 11, in Claim 17, delete "east" and insert -- least --, therefor.

Signed and Sealed this
First Day of February, 2011

David J. Kappos
*Director of the United States Patent and Trademark Office*